United States Patent Office 2,961,412
Patented Nov. 22, 1960

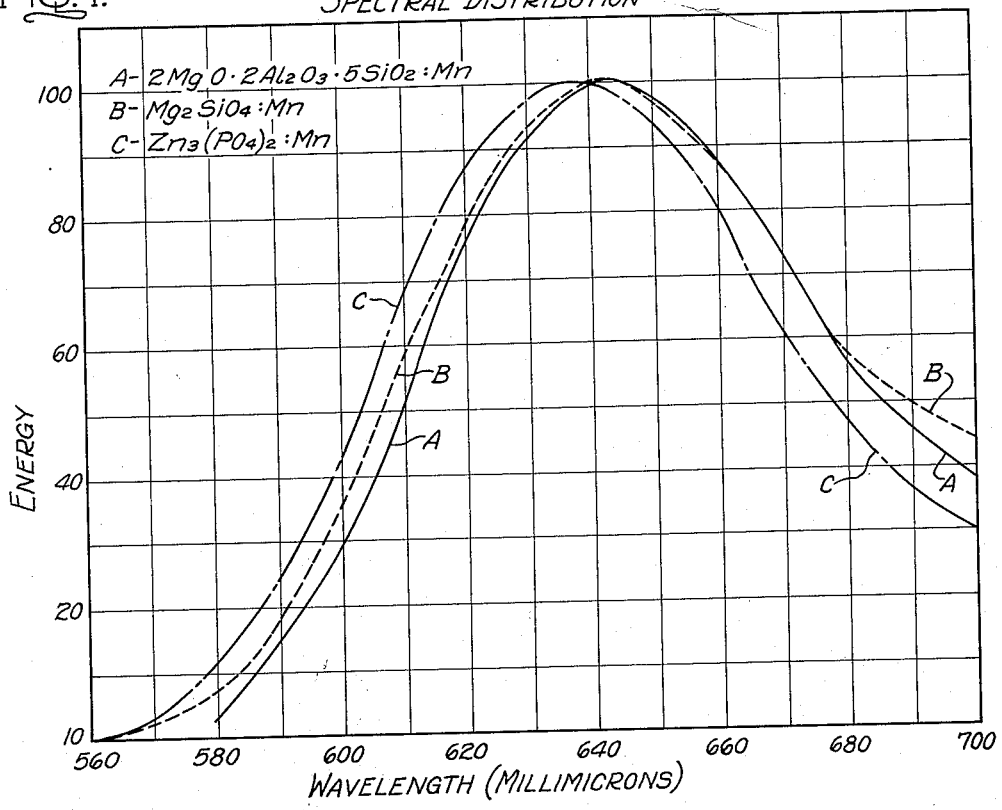
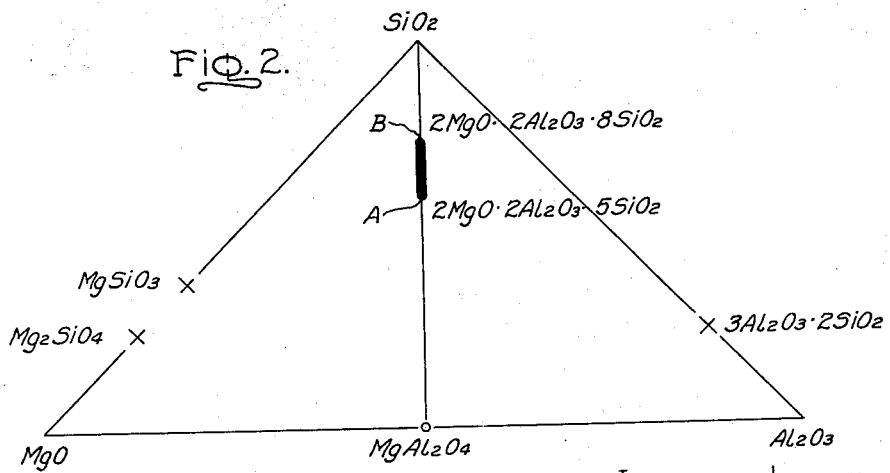

2,961,412

MAGNESIUM ALUMINUM SILICATE PHOSPHOR

Floyd A. Hummel, State College, Pa., assignor to General Electric Company, a corporation of New York Filed Aug. 20, 1957, Ser. No. 679,316

2 Claims. (Cl. 252—301.4)

This invention relates to luminescent materials or phosphors, and more particularly to a magnesium aluminum silicate phosphor.

It is an object of my invention to provide a manganese-activated magnesium aluminum silicate phosphor which is particularly responsive to cathode-ray excitation.

A further object of my invention is to provide an improved phosphor having red emission of longer wavelength than the commonly used cathode-ray phosphors.

According to the invention, a magnesium aluminum silicate phosphor is activated by manganese and emits a deep red band when excited by cathode-rays.

The invention will best be understood when considered with the accompanying drawings, in which:

Fig. 1 compares the spectral distribution of the present phosphor with known cathode-ray phosphors; and, Fig. 2 is a phase diagram illustrating possible compositions of the instant phosphor.

A manganese-activated magnesium aluminum silicate phosphor according to the present invention is illustrated by curve A. Curve B is a known manganese-activated magnesium silicate which emits in the red region when excited by cathode-ray radiation. Curve C is a manganese-activated zinc phosphate phosphor, which is also a red-emitting phosphor under cathode-ray excitation. The manganese-activated zinc phosphate phosphor is a known phosphor and is the material presently being widely used as the red component in color television tubes. The deeper red of the magnesium silicate according to the present invention makes it desirable as the red component in color television tubes; it may, however, be used for a variety of other purposes such as color correction.

Referring to Fig. 2, there is illustrated a phase diagram between magnesium oxide (MgO), aluminum oxide ($Al_2O_3$), and silica or silicon dioxide ($SiO_2$). The phosphor matrix according to the present invention is illustrated by the line AB; the lower limit being composed of $2MgO \cdot 2Al_2O_3 \cdot 5SiO_2$ and the upper limit being composed of $2MgO \cdot 2Al_2O_3 \cdot 8SiO_2$. The lower limit of $2MgO \cdot 2Al_2O_3 \cdot 5SiO_2$ is the natural occurring mineral cordierite. Cordierite forms solid solutions with silica up to a molecular ratio of $2MgO \cdot 2Al_2O_3 \cdot 8SiO_2$. In this solid solution from A to B, the same crystal produces luminescence when properly activated. Any deviation from line AB will still result in the characteristic red component of cordierite but such luminescent emission of cordierite will be diluted with the emissions of other materials. Concerning the ternary system $MgO \cdot Al_2O_3 \cdot SiO_2$, cordierite can be made to appear in many compositions surrounding the composition represented by line AB. If compositions off the line joining cordierite and silica are prepared, one will expect to get $SiO_2$ (silica), $MgAl_2O_4$ (spinel), $MgSiO_3$, $Mg_2SiO_4$, $3Al_2O_3 \cdot 2SiO_2$ (mullite), or $Al_2O_3$ (corundum, naturally occurring aluminum oxide) as associated phases. Therefore, on any composition off line AB, the red component of cordierite will still be there; but the color of the emission may be diluted by the luminescence of the diluting component. For example, a composition lying between line AB and $MgSiO_3$ or $Mg_2SiO_4$, which, of themselves, are red fluorescing phosphors, will produce a red fluorescing mixture, the red component of which is a combination of the red band of the cordierite and the red band of the $MgSiO_3$ or of the $Mg_2SiO_4$; or if a composition lying below point A and toward the spinel ($MgAl_2O_4$) is prepared, the color of the emission of the composition will be diluted with the red emission band of the cordierite and of the green emission band of the spinel.

The luminescent material according to the invention may be prepared by the solid state reaction of the magnesium oxide, aluminum oxide, and silicon dioxide, with the addition of the manganese activator in the form of manganese carbonate ($MnCO_3$), or other well-known manganese salts preferably of the type which decomposes on heating into a halide or oxide and a volatile gas, for example, manganese nitrate, sulphate or acetate. The mixture is then fired between 1200° C. and 1400° C., the temperature range of about 1325° C. to 1375° C. appears to be optimum where no flux is used. The firing, where no flux is used, is conducted for at least four hours; firing in excess of about two hundred hours does not appear to have any added advantage. It has been found, however, that the temperature and firing time can be appreciably reduced by the addition of a flux such as magnesium fluoride ($MgF_2$). Magnesium fluoride flux can be used in the range of about 0.05 mole to 0.5 mole per 2 moles of MgO in the matrix composition of the final phosphor; with about 0.2 mole of magnesium fluoride flux giving satisfactory effective results. With the addition of the flux, firing may be as short as one hour at a temperature in the range of 1200° C. to 1300° C.; firing for two hours appears to produce satisfactory results, but longer firing time may give a slightly more efficient phosphor; there appears to be no added advantage in firing for more than about two hundred hours.

Specific examples for the preparation of the phosphor according to the invention are as follows:

(1) The following ingredients are combined in the solid state:

66.5 gm. MgO
12.5 gm. $MgF_2$ (Flux)
18.5 gm. $MnCO_3$ (44.5% Mn)
312 gm. $Al_2O_3 \cdot 3H_2O$
339 gm. $SiO_2 \cdot XH_2O$ (13% $H_2O$)

This is essentially equivalent to 1.65 moles of MgO, 0.2 mole of $MgF_2$, .15 mole of $MnCO_3$, 2 moles of $$Al_2O_3 \cdot 3H_2O$$

and 5 moles of $SiO_2 \cdot XH_2O$. The manganese carbonate ($MnCO_3$) is not chemically pure and is analyzed to determine the weight of manganese therein. Similarly the silicon dioxide is not chemically pure but contains water and is therefore analyzed to determine the weight of water and the weight of silicon dioxide. The above mixture is fired at 1200° C. for one hour, crushed and refired to 1000° C. for fifteen hours. The fired reaction product has essentially the matrix composition of $$2MgO \cdot 2Al_2O_3 \cdot 5SiO_2$$

wherein 0.15 mole of the magnesium have been replaced by manganese. While the manganese constitutes the activator for the cordierite, it is in the form of manganese oxide as the manganese is merely substituted for the magnesium.

(2) Without the addition of a flux to promote the reaction, the luminescent material may be prepared by combining the following ingredients:

36 gms. MgO
12.32 gm. $MnCO_3$ (44.5% Mn)
156 gm. $Al_2O_3 \cdot 3H_2O$
177.5 gm. $SiO_2 \cdot XH_2O$ (13% $H_2O$)

This is essentially equivalent to 1.8 moles of MgO, 0.2 mole of $MnCO_3$, 2 moles $Al_2O_3 \cdot 3H_2O$ and 5.24 moles of $SiO_2 \cdot XH_2O$. This mixture is fired at 1340° C. for twenty hours. The fired reaction product is essentially similar to that obtained in Example 1 above, having the matrix composition of $2MgO \cdot 2Al_2O_3 \cdot 5.24SiO_2$ wherein 0.2 mole of the magnesium have been replaced by manganese.

(3) A phosphor having essentially the composition of $2MgO \cdot 2Al_2O_3 \cdot 8SiO_2$ but having 0.2 mole of magnesium replaced by manganese activator may be formed by combining the following ingredients.

24.9 gm. $MgF_2$ (Flux)
24.6 gm. $MnCO_3$ (44.5% Mn)
56.4 gm. MgO
312 gm. $Al_2O_3 \cdot 3H_2O$
542 gm. $SiO_2 \cdot XH_2O$ (13% $H_2O$)

This is essentially equivalent to 0.4 mole of $MgF_2$, 0.2 mole $MnCO_3$, 1.4 moles MgO, 2 moles $Al_2O_3 \cdot 3H_2O$ and 8 moles $SiO_2 \cdot XH_2O$. The mixture is fired the same as Example 1 above.

As previously stated, the optimum matrix is along line AB in the phase diagram with a quantity of the magnesium replaced by manganese activator. If the luminescent material is represented by the equation $XMgO \cdot YAl_2O_3 \cdot ZSiO_2 : AMnO$, a satisfactory red fluorescent phosphor may be obtained where $X+A$ is in the range of 1.8 to 2.2; Y is in the range 1.8 to 2.2; Z is in the range of 4.8 to 8.2; and A is in the range of 0.07 to 0.4. $A=0.2$ mole appears to give optimum results; more than 0.4 mole of manganese oxide appears to reduce the brightness of the luminescent material.

It can be seen that many modifications can be made, for example, the phosphor in Examples 1 and 3 does not need to be refired; the manganese activator may be added as other salts of manganese; and the ratio of the compositions may be in a wide range. The invention, therefore, is to be limited only by the claims annexed to and forming a part of this specification.

What I claim as new and desire to secure by Letters Patent of the United States is:

1. A luminescent material having essentially the formulae $XMgO \cdot YAl_2O_3 \cdot ZSiO_2 : AMnO$ wherein $X+A$ is in the range of 1.8 to 2.2, Y is in the range of 1.8 to 2.2, Z is in the range of 4.8 to 8.2, and A is in activator proportions in the range of about 0.07 to 0.4.

2. A luminescent material having essentially the formulae $XMgO \cdot YAl_2O_3 \cdot ZSiO_2 : AMnO$ wherein $X+A$ is about 2, Y is about 2, Z is in the range of about 5 to 8, and A is about 0.2.

References Cited in the file of this patent

UNITED STATES PATENTS

| | | |
|---|---|---|
| 2,141,905 | Fonda | Dec. 27, 1938 |
| 2,254,956 | Aschermann | Sept. 2, 1941 |
| 2,257,667 | Aschermann | Sept. 30, 1941 |
| 2,308,736 | Aschermann | Jan. 19, 1943 |